United States Patent
Hayes

(10) Patent No.: US 7,580,135 B2
(45) Date of Patent: Aug. 25, 2009

(54) CHROMATIC COMPENSATION IN FIZEAU INTERFEROMETER

(75) Inventor: John Hayes, Tucson, AZ (US)

(73) Assignee: 4D Technology Corporation, Tucson, AZ (US)

( * ) Notice: Subject to any disclaimer, the term of this patent is extended or adjusted under 35 U.S.C. 154(b) by 59 days.

(21) Appl. No.: 11/821,223

(22) Filed: Jun. 22, 2007

(65) Prior Publication Data

US 2007/0296978 A1 Dec. 27, 2007

Related U.S. Application Data

(60) Provisional application No. 60/815,989, filed on Jun. 23, 2006.

(51) Int. Cl.
*G01B 9/02* (2006.01)
(52) U.S. Cl. ...................................... 356/512
(58) Field of Classification Search ......... 356/512–516, 356/519
See application file for complete search history.

(56) References Cited

U.S. PATENT DOCUMENTS

| 5,416,586 A * | 5/1995 | Tronolone et al. ........... 356/513 |
| 7,012,700 B2 * | 3/2006 | De Groot et al. ............. 356/512 |
| 2006/0221350 A1 * | 10/2006 | Murphy et al. ............... 356/614 |

* cited by examiner

*Primary Examiner*—Hwa (Andrew) S Lee
(74) *Attorney, Agent, or Firm*—Antonio R. Durando

(57) ABSTRACT

The focus of the collimating lens in the optical train of a Fizeau interferometer is adjusted to change the power of the test beam illuminating the transmission sphere. As a result, the rays can be made sufficiently perpendicular to the reference surface to eliminate the chromatic focus shift and non-common path errors produced by a light source of wavelength different from the design wavelength of the transmission sphere. By making the position of the collimating lens relative to the beam expander adjustable along the optical axis over some small range, illumination sources of various wavelength can be used in the same interferometer.

12 Claims, 3 Drawing Sheets

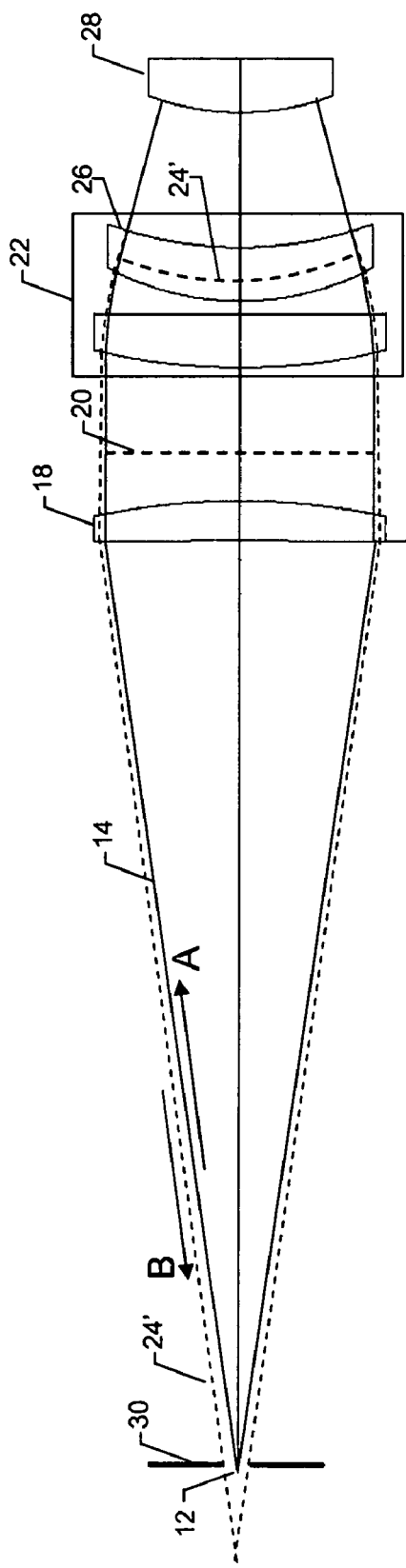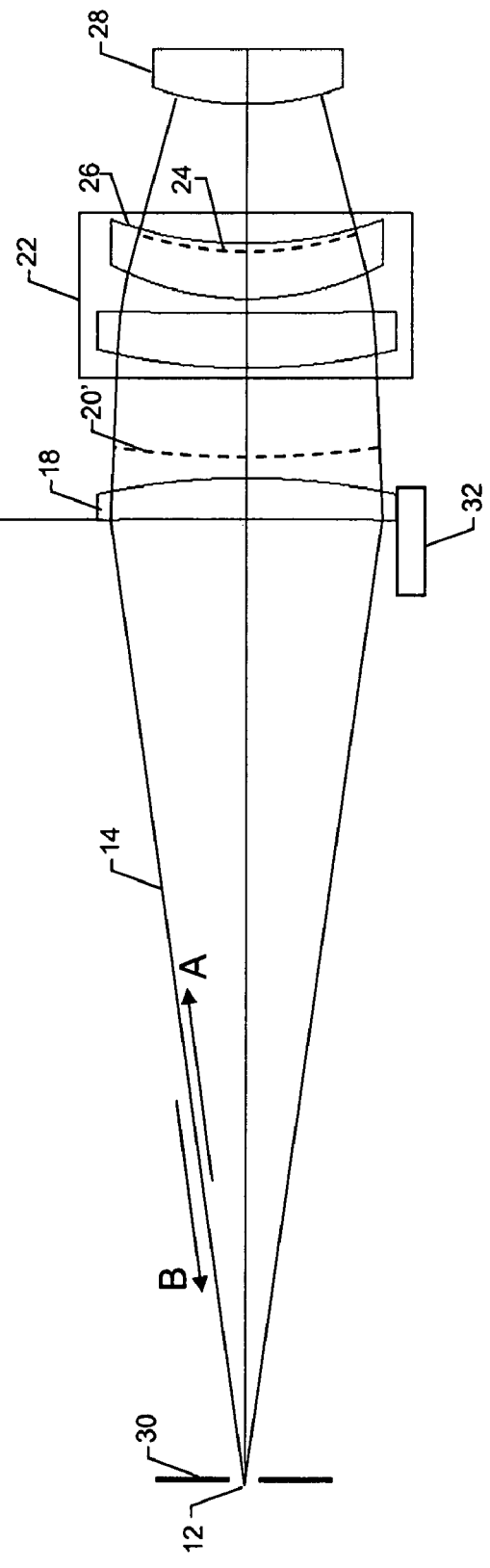
FIG 2
FIG 3

CHROMATIC COMPENSATION IN FIZEAU INTERFEROMETER

RELATED APPLICATIONS

This application is based on U.S. Provisional Application Ser. No. 60/815,989, filed on Jun. 23, 2006.

BACKGROUND OF THE INVENTION

1. Field of the Invention

The invention relates in general to Fizeau interferometers for optical testing of spherical surfaces.

2. Description of the Prior Art

In order to test optical components with non-zero power using a Fizeau interferometer, a precision Fizeau lens called a "transmission sphere" must be used. A key advantage of the Fizeau interferometer is that, in its normal configuration, both the test and reference beams pass along a common optical path within the interferometer. As a result, only a single reference surface needs to be made very accurately. The optics in the transmission sphere are designed to operate at a specific wavelength so that the transmitted wavefront contains rays nominally perpendicular to an accurate reference surface (i.e., the reference surface and the spherical wavefront produced by the transmission sphere have the same curvature).

Most commercial transmission spheres are designed for operation at the He—Ne laser wavelength of 632.8 nm. As the use of high-power solid-state lasers becomes more common in laser interferometers, there is often a need to use transmission spheres operating at different wavelengths, ranging, for example, from as low as 500-nm to the higher 637 nm to 670 nm approximate range, depending on the laser used as the light source. If the transmission sphere is used at a wavelength that is different from its design wavelength, aberrations are introduced into the transmitted wavefront. The most significant aberration that results from such a mismatch in wavelengths is a change in the optical power (also called chromatic focus shift).

Chromatic focus shift change causes two problems. First, the return beams are brought into focus at a different point within the instrument; that is, they are displaced from their nominal focus position (referred to as "defocusing" of the beams). The test beam can be refocused by shifting the test surface along the optical axis of the instrument, but that is not possible for the reference beam because of the fixed position of the reference surface in relation to the other optical elements in the transmission sphere. Thus, when the interferometer uses a field stop, the defocusing of the return beams can cause the reference beam to be partially blocked by the stop, which renders the system unusable. The second problem is that the light rays will not be nominally perpendicular to the reference surface and, as a result, the test and reference beams will no longer travel along a common path through the lens. This causes significant errors in the test results.

Therefore, it would be very desirable to have the ability to introduce a power correction into the optics transmitting the illumination beam in order to adjust for chromatic focus shifts in the transmission sphere caused by the use of different wavelengths at the source. This would allow, for instance, the use of a transmission lens designed for a specific wavelength, such 633 nm, at a different wavelength, such as 658 nm. The present invention provides a simple and inexpensive way to achieve this objective.

SUMMARY OF THE INVENTION

The invention lies in system for adjusting the focus of the collimating lens in the optical train of the Fizeau interferometer. By changing the power of the test beam illuminating the transmission sphere, the rays can be made sufficiently perpendicular to the reference surface to eliminate the chromatic focus shift and non-common path errors produced by a light source of wavelength different from the design wavelength of the transmission sphere. By making the position of the collimating lens relative to the beam expander adjustable along the optical axis over some small range (for example, around +/−3% of the focal length of the collimating lens), illumination sources of various wavelength can be used in the same interferometer (and, correspondingly, transmission spheres of a wide variety of focal lengths can be accommodated).

Other objects, features and advantages of the invention will become apparent to those skilled in the art from a consideration of the following detailed description taken in conjunction with the accompanying drawings and claims.

BRIEF DESCRIPTION OF THE DRAWINGS

FIG. 2 illustrates the effect of optical power aberration caused by the use of a light source of wavelength different from design.

FIG. 3 is a schematic representation of the invention and it illustrates the effect of the correction provided by an adjustable-focus collimating lens.

DESCRIPTION OF THE PREFERRED EMBODIMENT

Figure 1:
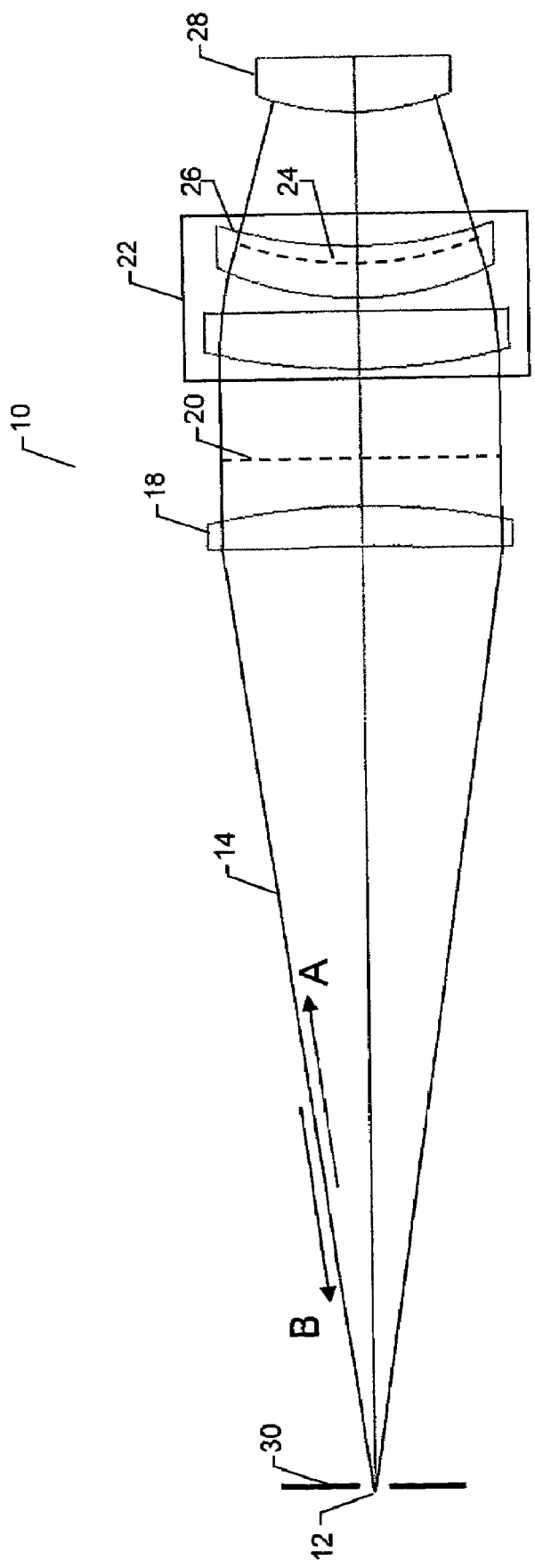
FIG. 1 is a simplified schematic representation of the optical train of a conventional Fizeau interferometer, as used for testing spherical surfaces.

Referring to FIG. 1, a conventional Fizeau interferometric device 10 for measuring optical components with positive optical power is illustrated in schematic form. A monochromatic point source 12 emits a light beam 14 that is expanding and then is collimated by a collimator 18 to produce a plane wavefront 20. A conventional transmission sphere 22 is used to produce a reference beam 24 by reflection off of a precision reference surface 26 that is designed to reflect a perfectly spherical wavefront. The light transmitted by the transmission sphere 22 is directed toward a test surface 28 that produces a test beam that is reflected back toward a detector (not shown) through the transmission sphere 22 and the collimator 18. For simplicity, the test and reference beams are illustrated as returning to the point source (arrows A and B referring to the outgoing and returning beams, respectively), but one skilled in the art would understand that in practice a beamsplitter (not shown) would be used to direct the return beams toward a plane conjugate to the plane of the source 12. A field stop 30 is normally used at the back end of the instrument to limit non-common path errors that can be introduced at large tilt values.

FIG. 2 illustrates the typical aberration caused by the use of a transmission sphere designed to operate at a nominal wavelength with an interferometer having a light source 12 of different wavelength. As a result, the spherical reference beam 24' produced by the reference surface 26 will no longer have the desired curvature and, in turn, it will not focus on a plane conjugate to the plane of the point source 12 after returning through the transmission sphere 22 and the collimating lens 18 (that is, the reference beam is defocused, as illustrated by the axial displacement along the optical train). Thus, a portion of the reference beam 22' is blocked by the field stop 30, as illustrated. In addition, though not illustrated, because both the reference and the test beams will not be perfectly perpendicular to the reference surface 26, they will no longer travel along common paths through the lens, which causes significant errors in the test results. Note that the test beam may be adjusted to focus by changing the position of the test surface 28, as illustrated in the figure, but no such adjustment is possible for the reference beam.

As illustrated schematically in FIG. 3, the invention consists of a system whereby the distance between the point source 12 and the collimating optics 18 may be varied by translating at least one of them along the optical axis of the Fizeau interferometer in order to shift the focal point position of the reference beam 24. By shifting the position of the lens 18 with respect to the point source 12 and correspondingly changing the power of the beam 14 illuminating the transmission sphere 20, the rays can be made sufficiently perpendicular to the reference surface 26 to eliminate chromatic focus shift and non-common path errors. As shown in the figure, the collimator 18 may be used to change the shape of the reference beam 24 to match the design curvature of the reference surface 26, thereby reproducing the nominal operating conditions of the transmission sphere even when a source of different wavelength is used.

Figure 4:
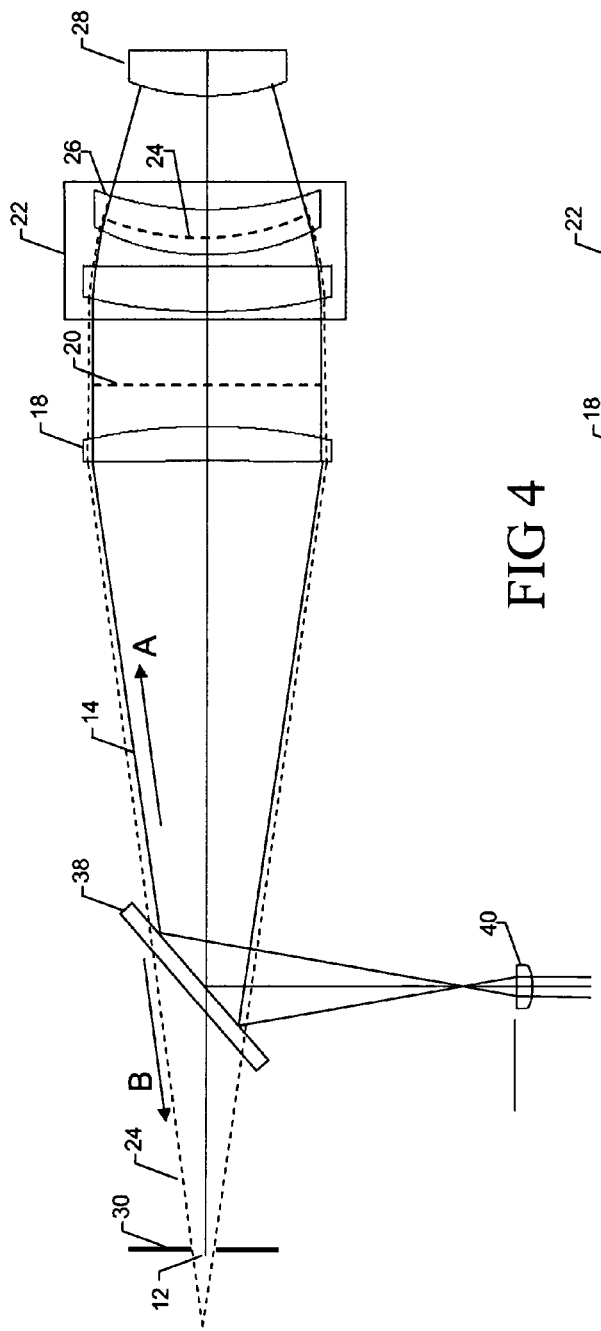
FIG. 4 illustrates the effect of optical power aberration caused by the use of a light source of wavelength different from design where a beamsplitter is used to separate the outgoing and return beams.
Figure 5:
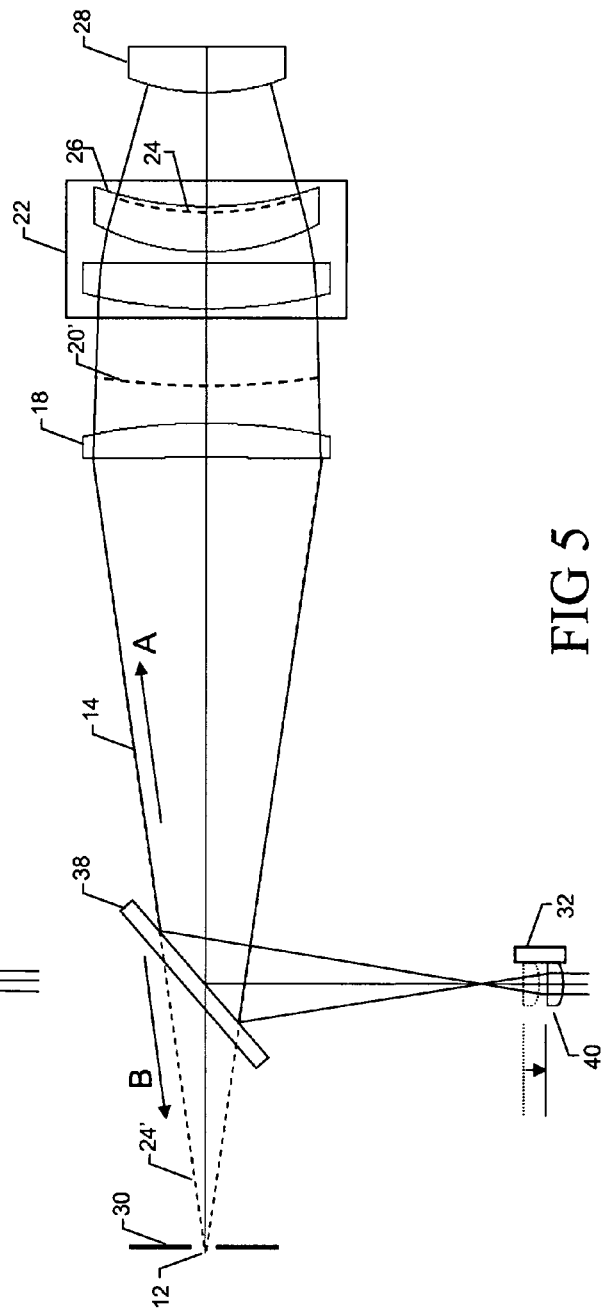
FIG. 5 illustrates schematically a mechanism operating on the eyepiece lens of the beam expander of a conventional interferometer.

It was found that an adjustment of about +/−3% of the focal length of the collimating lens 18 (such as produced by a mechanism 32 that allows translation of the lens with respect to the beam expander) makes it possible to accommodate transmission lenses of a wide variety of focal lengths within an approximate wavelength deviation of about +/−30 nm. Clearly, the same results can be achieved by translating the location of the point source 12, rather than the collimating lens 18, or by shifting both. For example, as shown schematically in FIGS. 4 and 5, the same result could be obtained advantageously by refocusing the "eyepiece lens" of the expander; that is, by shifting the beam expander 40 rather than the collimating lens. Those skilled in the art will recognize that the mechanism 32, whether operating on the beam expander 40 or the collimator optics 18, may consist of a variety of well known devices such as, without limitation, stepper motors, screw drives, rotary actuators, linear actuators, clockwork-spring-like mechanisms, a spring with assist from an electromechanical device, air motors, fluid drives, DC motors with servo control, solenoids, or any of a variety of single or multiphase AC motors.

Those skilled in the art will recognize that the reference beam adjusted according to the invention will not be perfect because of the effects of spherochromatism, but it was found to be generally sufficient for high-quality surface measurements. Thus, the invention affords a simple, inexpensive, and yet powerful tool to solve a current problem in the art. Moreover, the alignment system normally built into the Fizeau interferometer can be used directly to adjust the position of the collimator. This is achieved in straightforward manner by finding the collimator position that minimizes the size of the spot produced by the reflection from the reference surface on the alignment screen of the instrument.

While the invention has been shown and described herein with reference to what is believed to be the most practical embodiment, it is recognized that departures can be made within the scope of the invention. Therefore, the invention is not to be limited to the details disclosed herein but is to be accorded the full scope of equivalent articles.

I claim:

1. A Fizeau interferometer for testing spherical surfaces comprising:
    a light source producing an illumination beam of predetermined wavelength directed along an optical path toward a test surface;
    a collimator collimating said illumination beam;
    a transmission sphere positioned along said optical path between the collimator and the test surface, said transmission sphere including a reference surface of the interferometer; and
    actuating means for varying a distance between the light source and the collimator so as to affect a focal point position of a reference beam reflected from the reference surface.

2. The Fizeau interferometer of claim 1, wherein said actuating means is operating by translating the collimator.

3. The Fizeau interferometer of claim 1, further including a beam expander positioned along said optical path between the light source and the collimator, and wherein said actuating means is operating by varying a distance between the beam expander and the collimator.

4. The improvement of claim 3, wherein said actuating means is operating by translating an eyepiece lens of the beam expander.

5. A method of correcting for chromatic focus shift in a Fizeau interferometer including a light source of predetermined wavelength directing an illumination beam along an optical axis toward a collimator and a test surface, wherein the interferometer further includes a transmission sphere positioned along said optical axis between the collimator and the test surface, the method comprising the steps of providing an actuating means for varying a distance between the light source and the collimator, and of compensating for a chromatic focus shift in the Fizeau interferometer by using said actuating means to shift a focal point position of a reference beam reflected by the reference surface.

6. The method of claim 5, wherein said compensating step is carried out by translating the collimator.

7. The method of claim 5, wherein the Fizeau interferometer further includes a beam expander positioned along said optical axis between the light source and the collimator, the actuating means is operating by varying a distance between the beam expander and the collimator, and the compensating step is carried out by varying a distance between the beam expander and the collimator.

8. The method of claim 7, wherein said compensating step is carried out by translating an eyepiece lens of the beam expander.

9. A method for adjusting an optical power of an illumination beam to match a design specification of a transmission sphere of a Fizeau interferometer, said interferometer including a light source of predetermined wavelength directing an illumination beam along an optical axis toward a collimator and a test surface, said transmission sphere being positioned along said optical axis between the collimator and the test surface, the method comprising the steps of providing an actuating means for varying a distance between the light source and the collimator, and of adjusting the optical power of the illumination beam produced by the light source by using said actuating means to shift a focal point position of a reference beam reflected by the reference surface.

10. The method of claim 9, wherein said adjusting step is carried out by translating the collimator.

11. The method of claim 9, wherein the Fizeau interferometer further includes a beam expander positioned along said optical axis between the light source and the collimator, the actuating means is operating by varying a distance between the beam expander and the collimator, and the adjusting step is carried out by varying a distance between the beam expander and the collimator.

12. The method of claim 11, wherein said adjusting step is carried out by translating an eyepiece lens of the beam expander.

* * * * *